United States Patent
Tsai

(10) Patent No.: US 12,526,817 B2
(45) Date of Patent: Jan. 13, 2026

(54) METHOD FOR MONITORING TCI FIELD OF DCI FORMAT

(71) Applicant: MediaTek INC., Hsin-Chu (TW)

(72) Inventor: Cheng-Rung Tsai, Hsin-Chu (TW)

(73) Assignee: MediaTek Inc., Hsin-Chu (TW)

( * ) Notice: Subject to any disclaimer, the term of this patent is extended or adjusted under 35 U.S.C. 154(b) by 278 days.

(21) Appl. No.: 18/117,385

(22) Filed: Mar. 3, 2023

(65) Prior Publication Data
US 2023/0209570 A1  Jun. 29, 2023

Related U.S. Application Data

(63) Continuation of application No. PCT/CN2021/117906, filed on Sep. 13, 2021.

(60) Provisional application No. 63/083,220, filed on Sep. 25, 2020.

(51) Int. Cl.
| | |
|---|---|
| H04W 72/23 | (2023.01) |
| H04B 7/06 | (2006.01) |
| H04L 5/00 | (2006.01) |
| H04W 72/232 | (2023.01) |

(52) U.S. Cl.
CPC ...... *H04W 72/232* (2023.01); *H04B 7/06952* (2023.05); *H04L 5/0037* (2013.01); *H04L 5/0091* (2013.01)

(58) Field of Classification Search
CPC .. H04W 72/232; H04L 5/0037; H04L 5/0091; H04B 7/06952
See application file for complete search history.

(56) References Cited

U.S. PATENT DOCUMENTS

| | | | | |
|---|---|---|---|---|
| 2020/0045700 | A1* | 2/2020 | Sun | H04L 5/0091 |
| 2020/0367230 | A1* | 11/2020 | Raghavan | H04W 72/044 |
| 2021/0028898 | A1* | 1/2021 | Takeda | H04W 24/08 |
| 2021/0219336 | A1* | 7/2021 | Fan | H04L 5/0094 |

FOREIGN PATENT DOCUMENTS

| | | |
|---|---|---|
| CN | 109660286 A | 4/2019 |
| CN | 111226414 A | 6/2020 |

OTHER PUBLICATIONS

International Search Report and Written Opinion of International Search Authority for PCT/CN2021/117906, dated Dec. 1, 2021 (9 pages).
China Intellectual Property Office Action 202180065232.3 Dated Aug. 11, 2025 (No English Translation available).

* cited by examiner

*Primary Examiner* — Ronald B Abelson
(74) *Attorney, Agent, or Firm* — Helen Mao; Zheng Jin; Imperium Patent Works

(57) ABSTRACT

Apparatus and methods are provided for monitoring a TCI field of a DCI format. In one novel aspect, monitoring a specific TCI field of a DCI format is provided. A DCI format may be applied to a DCI used between UE(s) and a BS. The DCI format may include a plurality of TCI fields. Each UE may be assigned a TCI field. The UE(s) assigned the same TCI field may be considered as assigned in the same group. The UE(s) in the same group may applied the same TCI state(s) and the same network parameter(s).

16 Claims, 9 Drawing Sheets

METHOD FOR MONITORING TCI FIELD OF DCI FORMAT

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2021/117906, with an international filing date of Sep. 13, 2021, which in turn claims priority from U.S. Provisional Application No. 63/083,220, entitled "Group Common Transmission Configuration Indication," filed on Sep. 25, 2020. This application is a continuation of International Application No. PCT/CN2021/117906, which claims priority from U.S. provisional applications 63/083,220. International Application No. PCT/CN2021/117906 is pending as of the filing date of this application, and the United States is a designated state in International Application No. PCT/CN2021/117906. The disclosure of each of the foregoing documents is incorporated herein by reference.

TECHNICAL FIELD

The disclosed embodiments relate generally to wireless communication, and, more particularly, to method for monitoring transmission configuration indication (TCI) field of downlink control information (DCI) format.

BACKGROUND

In conventional network of 3rd generation partnership project (3GPP) 5G new radio (NR), the user equipment (UE) can be configured, by the base station (BS), with a plurality of transmission configuration indication (TCI) state for downlink (DL) transmission. One TCI state is configured with quasi co-location information (QCL-Info), and each QCL-Info includes a reference signal (RS) and an associated QCL type. The TCI state can be used for indicating the UE a beam for transmission. More particularly, a beam indication is UE specific.

However, when a group of UEs having same conditions (e.g., same moving speed, same moving direction, etc.) can be indicated to apply the same beam, the UEs still need to be indicated to apply the same beam by respective TCI state, which is very inefficient and can cause heavier network load.

SUMMARY

Apparatus and methods are provided for monitoring a transmission configuration indication (TCI) field of a downlink control information (DCI) format. In one novel aspect, monitoring a specific TCI field of a DCI format is provided. In particular, a DCI format may be applied to a DCI used between user equipment (UEs) and a base station (BS). The DCI format may include a plurality of TCI fields. Each UE may be assigned a TCI field. The UE(s) assigned the same TCI field may be considered as assigned in the same group. The UE(s) in the same group may applied the same TCI state(s) and the same network parameter(s).

In one embodiment, a UE receives a first command from a network. The first command indicates to the UE a location or a number of a specific TCI field in a DCI format. Therefore, the UE determines to monitor the specific TCI field of the DCI format according to the location or the number indicated by the first command.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
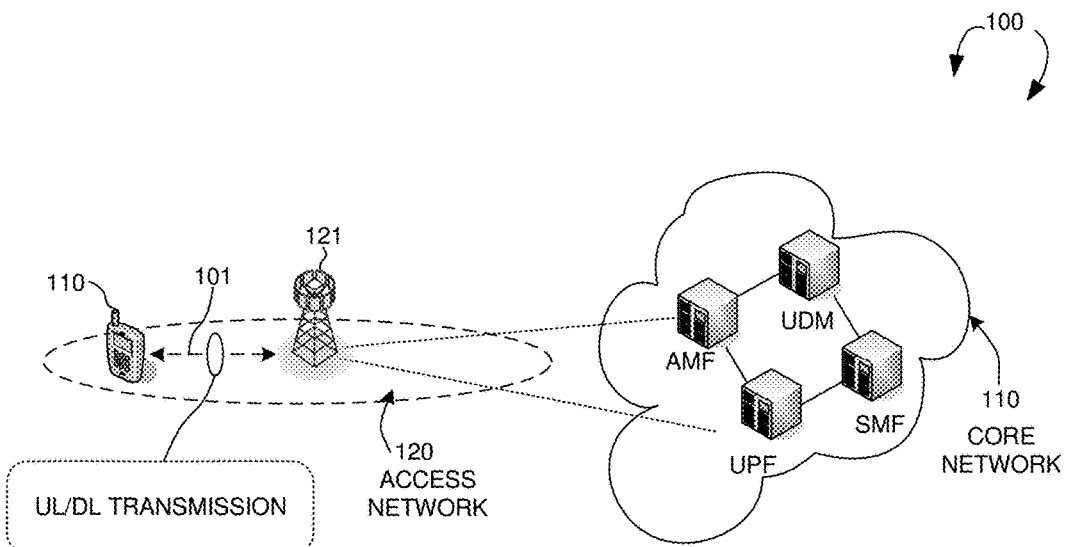
FIG. 1 illustrates an exemplary 5G new radio network supporting monitor of TCI field of DCI format in accordance with embodiments of the current invention.

FIG. 1 illustrates an exemplary 5G new radio (NR) network 100 supporting monitor of TCI field of DCI format in accordance with aspects of the current invention. The 5G NR network 100 includes a user equipment (UE) 110 communicatively connected to a gNB 121 operating in a licensed band (e.g., 30 GHz~300 GHz for mmWave) of an access network 120 which provides radio access using a Radio Access Technology (RAT) (e.g., the 5G NR technology). The access network 120 is connected to a 5G core network 130 by means of the NG interface, more specifically to a User Plane Function (UPF) by means of the NG user-plane part (NG-u), and to a Mobility Management Function (AMF) by means of the NG control-plane part (NG-c). One gNB can be connected to multiple UPFs/AMFs for the purpose of load sharing and redundancy. The UE 110 may be a smart phone, a wearable device, an Internet of Things (IoT) device, and a tablet, etc. Alternatively, UE 110 may be a Notebook (NB) or Personal Computer (PC) inserted or installed with a data card which includes a modem and RF transceiver(s) to provide the functionality of wireless communication.

The gNB 121 may provide communication coverage for a geographic coverage area in which communications with the UE 110 is supported via a communication link 101. The communication link 101 shown in the 5G NR network 100 may include UL transmissions from the UE 110 to the gNB 121 (e.g., on the Physical Uplink Control Channel (PUCCH) or Physical Uplink Shared Channel (PUSCH)) or downlink (DL) transmissions from the gNB 121 to the UE 110 (e.g., on the Physical Downlink Control Channel (PDCCH) or Physical Downlink Shared Channel (PDSCH)).

Figure 2:
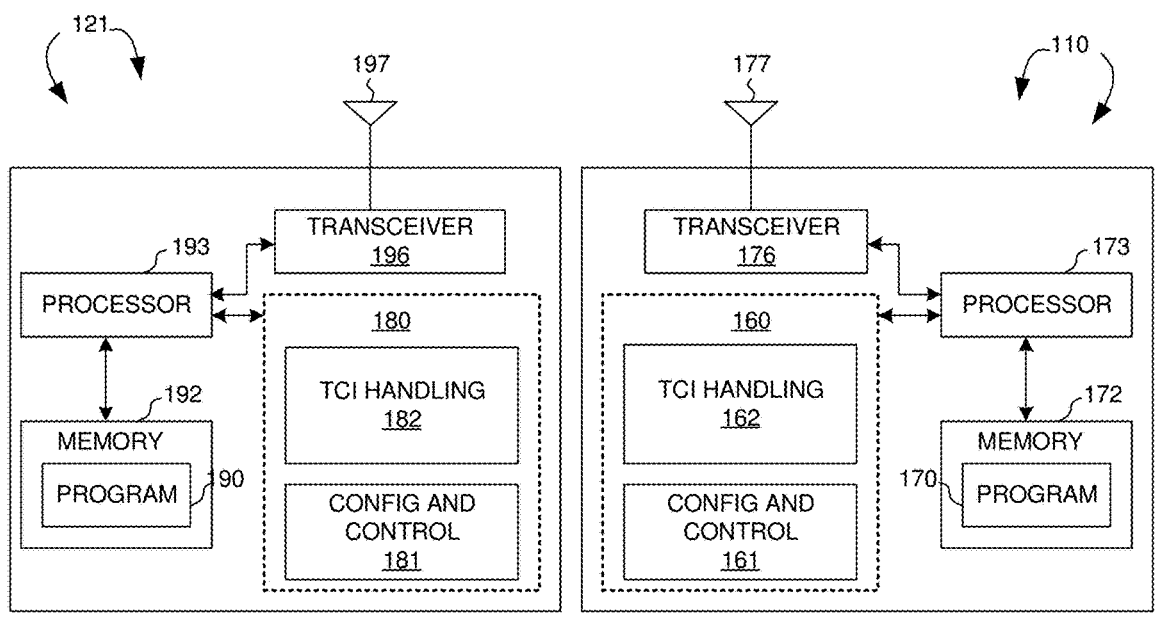
FIG. 2 is a simplified block diagram of the gNB and the UE in accordance with embodiments of the current invention.

FIG. 2 is a simplified block diagram of the gNB 121 and the UE 110 in accordance with embodiments of the present invention. For the gNB 121, an antenna 197 transmits and receives radio signal. A radio frequency (RF) transceiver module 196, coupled with the antenna, receives RF signals from the antenna, converts them to baseband signals and sends them to processor 193. RF transceiver 196 also converts received baseband signals from the processor 193, converts them to RF signals, and sends out to antenna 197. Processor 193 processes the received baseband signals and invokes different functional modules and circuits to perform features in the gNB 121. Memory 192 stores program instructions and data 190 to control the operations of the gNB 121.

Similarly, for the UE 110, antenna 177 transmits and receives RF signals. RF transceiver module 176, coupled with the antenna, receives RF signals from the antenna, converts them to baseband signals and sends them to processor 173. The RF transceiver 176 also converts received baseband signals from the processor 173, converts them to RF signals, and sends out to antenna 177. Processor 173 processes the received baseband signals and invokes different functional modules and circuits to perform features in the UE 110. Memory 172 stores program instructions and data 170 to control the operations of the UE 110.

The gNB 121 and the UE 110 also include several functional modules and circuits that can be implemented and configured to perform embodiments of the present invention. In the example of FIG. 2, the gNB 121 includes a set of control functional modules and circuit 180. Transmission configuration indication (TCI) handling circuit 182 handles TCI state(s) and associated network parameters for the UE 110. Configuration and control circuit 181 provides different parameters to configure and control the UE 110. The UE 110 includes a set of control functional modules and circuit 160. TCI handling circuit 162 handles TCI state(s) and associated network parameters. Configuration and control circuit 161 handles configuration and control parameters from the gNB 121.

Note that the different functional modules and circuits can be implemented and configured by software, firmware, hardware, and any combination thereof. The function modules and circuits, when executed by the processors 193 and 173 (e.g., via executing program codes 190 and 170), allow the gNB 121 and the UE 110 to perform embodiments of the present invention.

Figure 3A:
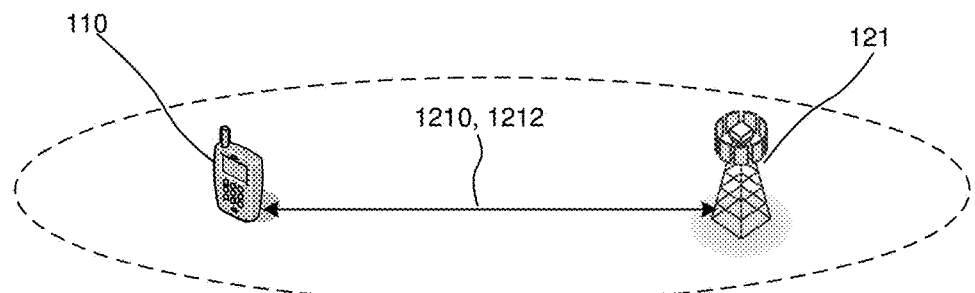
FIG. 3A illustrates one embodiment of message transmissions in accordance with embodiments of the current invention.

FIG. 3A illustrates one embodiment of message transmissions in accordance with one novel aspect. In particular, the gNB 121 transmits a higher layer configuration 1210 to the UE 110. The UE 110 receives the higher layer configuration 1210 from the gNB 121.

Figure 3B:
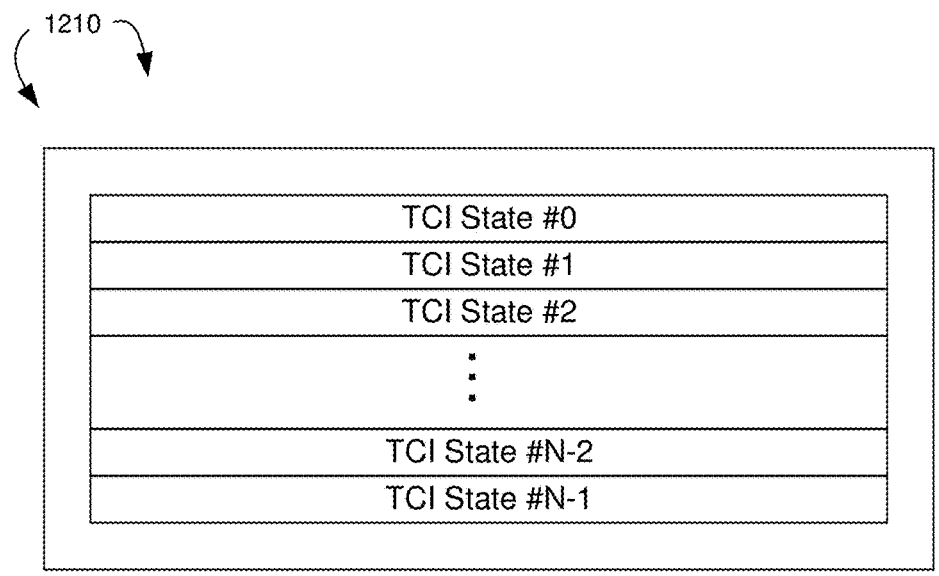
FIG. 3B illustrates one embodiment of the higher layer configuration in accordance with embodiments of the current invention.

FIG. 3B illustrates one embodiment of the higher layer configuration 1210 in accordance with one novel aspect. In detail, the higher layer configuration 1210 indicates to the UE 110 a plurality of TCI states '#0' to '#N−1' and a plurality of RS resources. Each of the TCI states '#0' to '#N−1' associates with at least one of the RS resources. It should be noted that the higher layer configuration 1210 may be a radio resource control (RRC) signal.

Figure 3C:
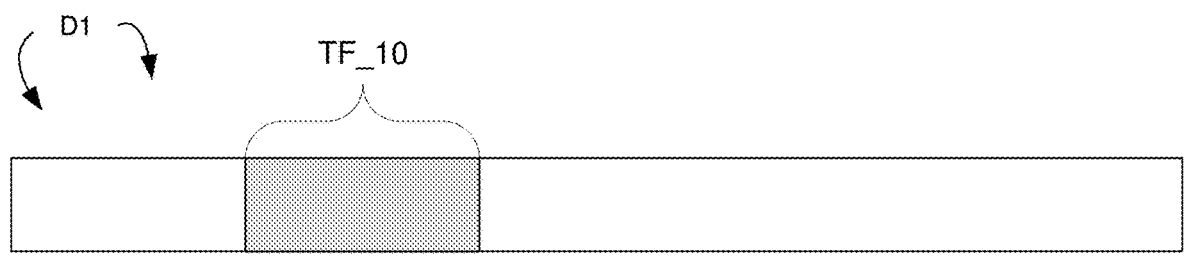
FIG. 3C illustrates one embodiment of the DCI format in accordance with embodiments of the current invention.

Then, the gNB 121 transmits a command 1212 to the UE 110. Please refer to FIG. 3C which illustrates one embodiment of a DCI format D1 in accordance with one novel aspect. The command 1212 indicates to the UE 110 to monitor a specific TCI field TF_10 of the DCI format D1. Therefore, after receiving the command 1212, the UE 110 determines to monitor the specific TCI field TF_10 of the DCI format D1 according to the command 1212. It should be noted that the command 1212 may be a media access control-control element (MAC-CE), and the DCI format D1 may be DCI format 2_0.

In one implementation, the command 1212 indicates to the UE 110 a location (e.g., a starting position or a starting bit) of the specific TCI field TF_10 of the DCI format D1. The UE 110 determines to monitor the specific TCI field TF_10 of the DCI format D1 according to the location.

In one implementation, the command 1212 indicates to the UE 110 a number assigned to the specific TCI field TF_10 of the DCI format D1. The UE 110 determines to monitor the specific TCI field TF_10 of the DCI format D1 according to the number. It should be noted that the order of the TCI fields in the DCI format D1 may be preconfigured to the gNB 121 and the UE 110.

Accordingly, the UE(s) indicated to monitor the same TCI field can be considered as being assigned in the same group. The UE(s) assigned in the same group may apply the same TCI state and the same network parameters.

Figure 4A:
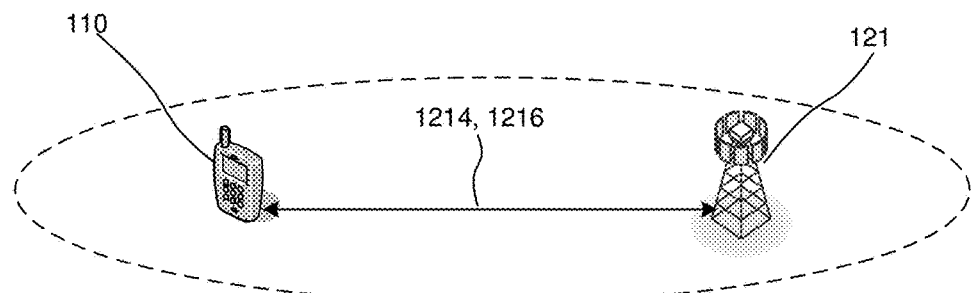
FIG. 4A illustrates one embodiment of message transmissions in accordance with embodiments of the current invention.

FIG. 4A illustrates one embodiment of message transmissions in accordance with one novel aspect. In particular, the gNB 121 transmits a higher layer configuration 1214 to the UE 110. The UE 110 receives the higher layer configuration 1214 from the gNB 121.

Figure 4B:
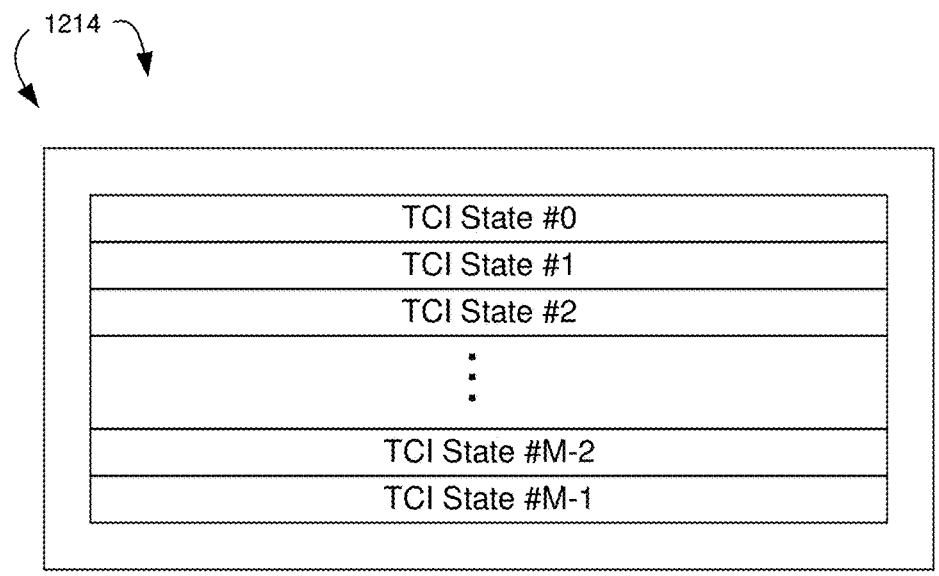
FIG. 4B illustrates one embodiment of the higher layer configuration in accordance with embodiments of the current invention.

FIG. 4B illustrates one embodiment of the higher layer configuration 1214 in accordance with one novel aspect. In detail, the higher layer configuration 1214 indicates to the UE 110 a plurality of TCI states '#0' to '#M−1' and a plurality of RS resources. Each of the TCI states '#0' to '#M−1' associates with at least one of the RS resources. It should be noted that the higher layer configuration 1214 may be an RRC signal.

Figure 4C:
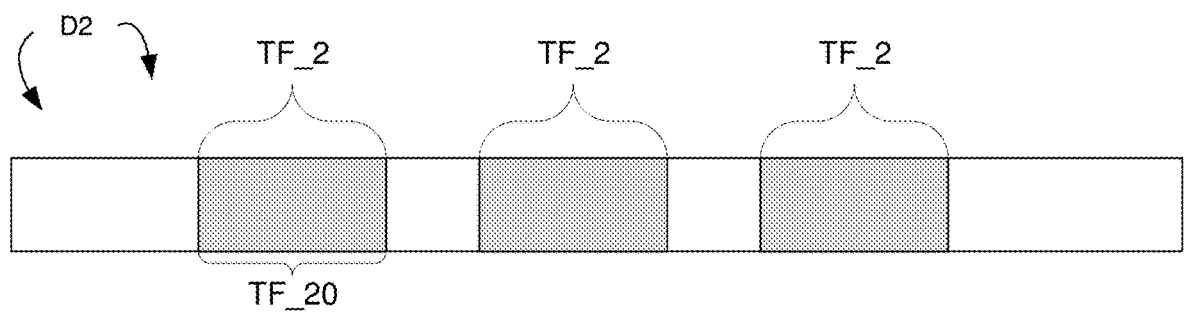
FIG. 4C illustrates one embodiment of the DCI format in accordance with embodiments of the current invention.

Then, the gNB 121 transmits a command 1216 to the UE 110. Please refer to FIG. 4C which illustrates one embodiment of a DCI format D2 in accordance with one novel aspect. The command 1216 indicates to the UE 110 to monitor a specific TCI field TF_20 of a plurality of TCI fields TF_2 of the DCI format D2. Therefore, after receiving the command 1216, the UE 110 determines to monitor the specific TCI field TF_20 of the TCI fields TF_2 of the DCI format D2 according to the command 1216. It should be noted that the command 1216 may be a MAC-CE and the DCI format D2 may be DCI format 2_0.

In one implementation, the command 1216 indicates to the UE 110 a location (e.g., a starting position or a starting bit) of the specific TCI field TF_20 of the DCI format D2. The UE 110 determines to monitor the specific TCI field TF_20 of the DCI format D2 according to the location. For example, the specific TCI field TF_20 starts from 'X'$_{th}$ bit of the DCI format D2. The command 1216 indicates to the UE 110 'X'$_{th}$ bit of the DCI format D2. Accordingly, the UE 110 determines to monitor the specific TCI field TF_20 of the DCI format D1 from 'X'$_{th}$ bit of the DCI format D2.

In one implementation, the command 1216 indicates to the UE 110 a number assigned to the specific TCI field TF 20 of the DCI format D2. The UE 110 determines to monitor the specific TCI field TF_20 of the DCI format D2 according to the number. For example, the specific TCI field TF_20 is the 'Y'$_{th}$ TCI field of the DCI format D2. The command 1216 indicates to the UE 110 to monitor 'Y'$_{th}$ TCI field of the DCI format D2. Accordingly, the UE 110 determines to monitor the 'Y'$_{th}$ TCI field of the DCI format D2. It should be noted that the order of the TCI fields in the DCI format D2 may be preconfigured to the gNB 121 and the UE 110.

Figure 4D:
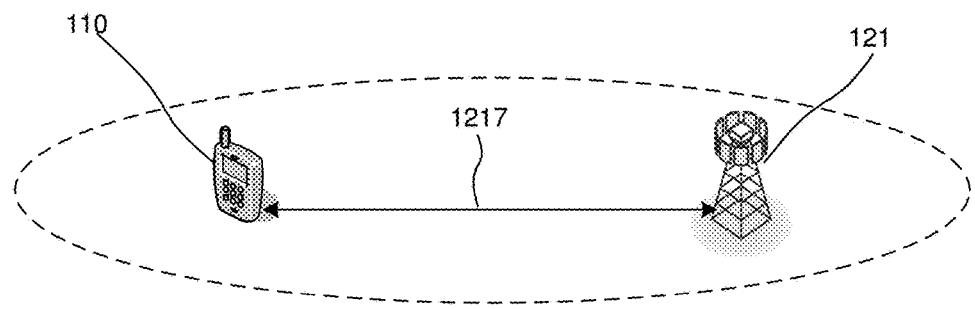
FIG. 4D illustrates one embodiment of message transmissions in accordance with embodiments of the current invention.
Figure 4E:
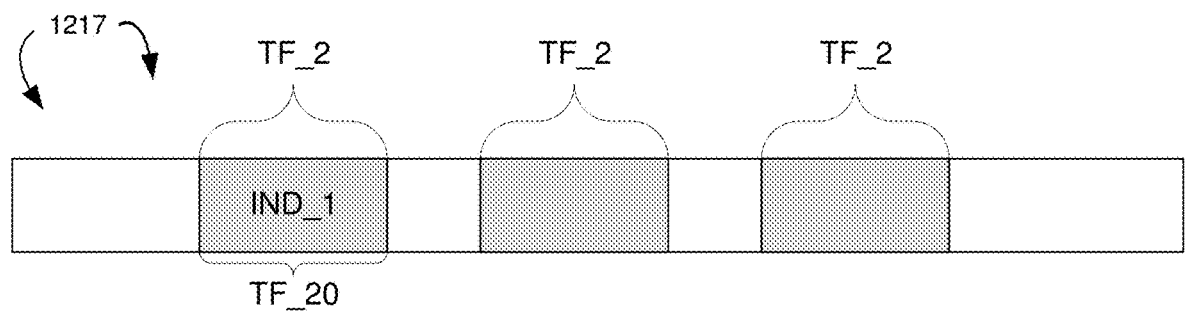
FIG. 4E illustrates one embodiment of the DCI in accordance with embodiments of the current invention.

FIG. 4D illustrates one embodiment of message transmissions in accordance with one novel aspect. In particular, the gNB 121 transmits a DCI 1217 to the UE 110. The DCI 1217 has the DCI format D2. The UE 110 receives the DCI 1217. Please refer to FIG. 4E which illustrates one embodiment of the DCI 1217 in accordance with one novel aspect. The UE 110 monitors the specific TCI field TF_20 of the DCI 1217 having the DCI format D2 and determines an index (i.e., a codepoint) IND_1 indicated in the specific TCI field TF_20. Then, the UE 110 determines at least one TCI state identification mapping to the index IND_1 and applies at least one TCI state corresponding to the at least one TCI state identification. For example, when the index IND_1 maps to TCI state identification 'm' which corresponds to TCI state '#m' of TCI states '#0' to '#M−1', the UE 110 applies TCI state '#m' and the network parameters corresponding to TCI state '#m'.

In one implementation, the mapping between the index IND 1 and the at least one TCI state identification may be configured by the command 1216. In particular, the command 1216 further includes a plurality of associations associating TCI state identification(s) with index(s). Each association maps at least one TCI state identification to one index. After receiving the command 1216, the UE 110 is configured with the associations. Accordingly, the UE 110 can determine the at least TCI state identification mapping to the index IND_1 according to the command 1216.

In one implementation, the mapping between the index of the TCI field TF 20 and the at least one TCI state identification may be configured by another command. In particular, the gNB 121 transmits the another command to the UE 110. The another command includes a plurality of associations associating TCI state identification(s) with index(s). Each association maps at least one TCI state identification to one index. After receiving the another command, the UE 110 is configured with the associations. Accordingly, the UE 110 can determine the at least one TCI state identification mapping to the index IND_1 according to the another command.

In one implementation, the mapping between the index of the TCI field TF 20 and the TCI state identification may be configured by the higher layer configuration 1214. In particular, the higher layer configuration 1214 further includes a plurality of associations associating TCI state identification(s) with index(s). Each association maps at least one TCI state identification to one index. After receiving the higher layer configuration 1214, the UE 110 is configured with the associations. Accordingly, the UE 110 can determine the at least one TCI state identification mapping to the index IND_1 according to the higher layer configuration 1214.

In one implementation, in addition to mapping to the at least one TCI state identification, the index IND_1 further maps to a power control setting identification. Accordingly, after determining the index IND_1, the UE 110 can determine the power control setting identification mapping to the index IND_1 and applies a power control setting corresponding to the power control setting identification.

In one implementation, the UE 110 applies the TCI state(s) after a time duration. In one case, the time duration is configured by the high layer configuration 1214. In one case, the time duration is preconfigured to the gNB 121 and the UE 110. In one case, the time duration is determined by a pre-defined rule and the higher layer configuration 1214. In one implementation, the UE 110 reports a UE capability related to the time duration to the gNB 121.

In one implementation, one or more cells can be associated with the specific TCI field (e.g., TCI field TF 20) based on the command 1216. In detail, the command 1216 can further indicate to the UE 110: (1) at least one cell identification; (2) a cell group identification; or (3) a specific cell identification of a cell configured in a cell group corresponding to the specific TCI field of the DCI format.

Further, when the UE 110 applies the TCI state(s) corresponding to the at least one TCI state identification indicated in the specific TCI field, the TCI state(s) is applied to: (1) at least one cell associated with the at least one cell identification; (2) a group of cells associated with the cell group identification; or (3) a group of cells including a cell associated with the specific cell identification.

In one implementation, the gNB 121 transmits another command to the UE 110. The UE 110 receives the another command. One or more cells can be associated with the specific TCI field based on the another command. In detail, the another command indicates to the UE 110: (1) at least one cell identification; (2) a cell group identification; or (3) a specific cell identification of a cell configured in a cell group.

Further, when the UE 110 applies the TCI state(s) corresponding to the at least one TCI state identification indicated in the specific TCI field, the TCI state(s) is applied to: (1) at least one cell associated with the at least one cell identification; (2) a group of cells associated with the cell group identification; or (3) a group of cells including a cell associated with the specific cell identification.

In one implementation, one or more cells can be associated with the specific TCI field based on the higher layer configuration 1214. In detail, the higher layer configuration 1214 further indicates to the UE 110: (1) at least one cell identification; (2) a cell group identification; or (3) a specific cell identification of a cell configured in a cell group.

Further, when the UE 110 applies the TCI state(s) corresponding to the at least one TCI state identification indicated in the specific TCI field, the TCI state(s) is applied to: (1) at least one cell associated with the at least one cell identification; (2) a group of cells associated with the cell group identification; or (3) a group of cells including a cell associated with the specific cell identification.

Accordingly, the UE(s) indicated to monitor the same TCI field can be considered as being assigned in the same group. The UE(s) assigned in the same group can applied the same TCI state(s) and the same network parameters.

Figure 5A:
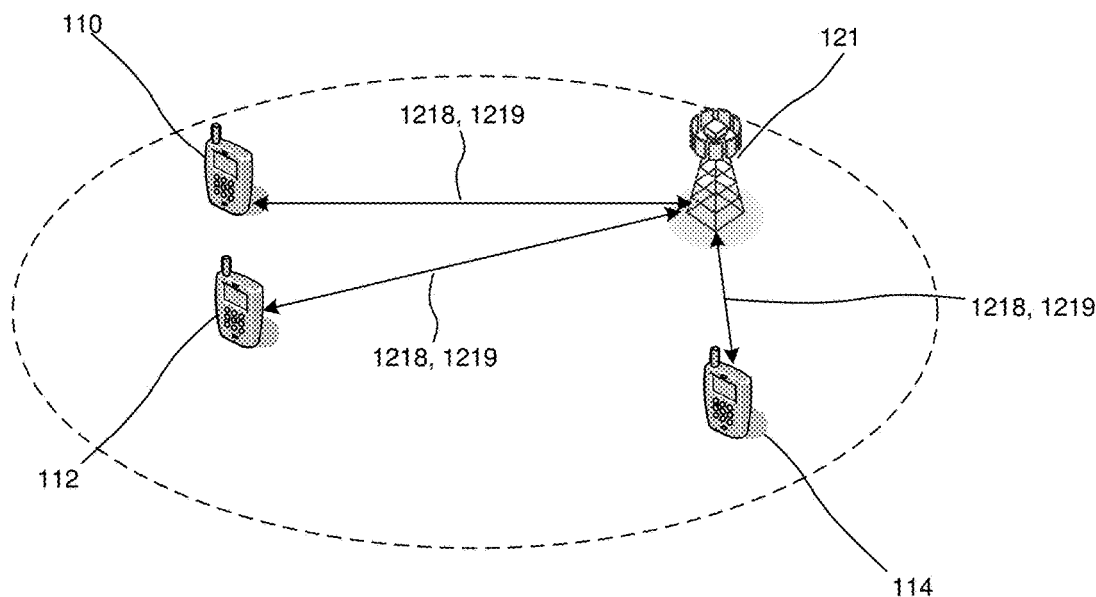
FIG. 5A illustrates one embodiment of message transmissions in accordance with embodiments of the current invention.

FIG. 5A illustrates one embodiment of message transmissions in accordance with one novel aspect. In particular, the gNB 121 transmits a higher layer configuration 1218 to the UE 110, 112 and 114. The UEs 110, 112 and 114 receive the higher layer configuration 1218 from the gNB 121. The higher layer configuration 1218 indicates to the UEs 110, 112 and 114 a plurality of TCI states and a plurality of RS resources.

Figure 5B:
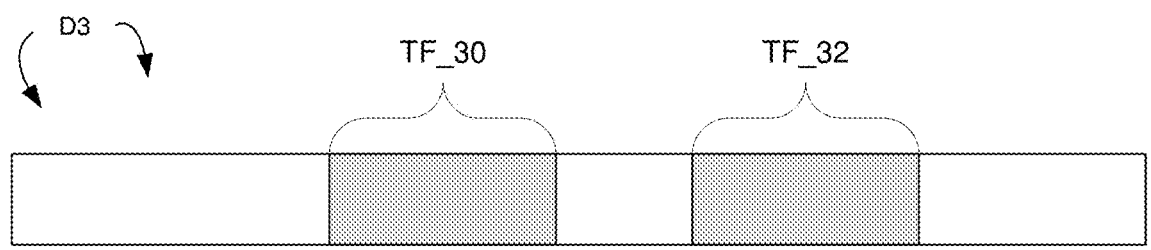
FIG. 5B illustrates one embodiment of the DCI format in accordance with embodiments of the current invention.

Then, the gNB 121 broadcasts a command 1219 to the UEs 110, 112 and 114. Please refer to FIG. 5B which illustrates one embodiment of a DCI format D3 in accordance with one novel aspect. The command 1219 indicates to the UEs 110 and 112 to monitor a specific TCI field TF_30 of the DCI format D3. The command 1219 indicates to the UE 114 to monitor a specific TCI field TF_32 of the DCI format D3.

Therefore, after receiving the command 1219, the UEs 110 and 112 determines to monitor the specific TCI field TF_30 of the DCI format D3 according to the command 1219. After receiving the command 1219, the UE 114 determines to monitor the specific TCI field TF_32 of the DCI format D3 according to the command 1219. It should be noted that the command 1219 may be a MAC-CE, and the DCI format D3 may be DCI format 2_0.

Accordingly, the UEs 110 and 112 indicated to monitor the same TCI field TF_30 can be considered as being assigned in the one group. the UE 114 indicated to monitor the TCI field TF_32 can be considered as being assigned in another group. The UE(s) assigned in the same group may apply the same TCI state and the same network parameters.

Figure 6A:
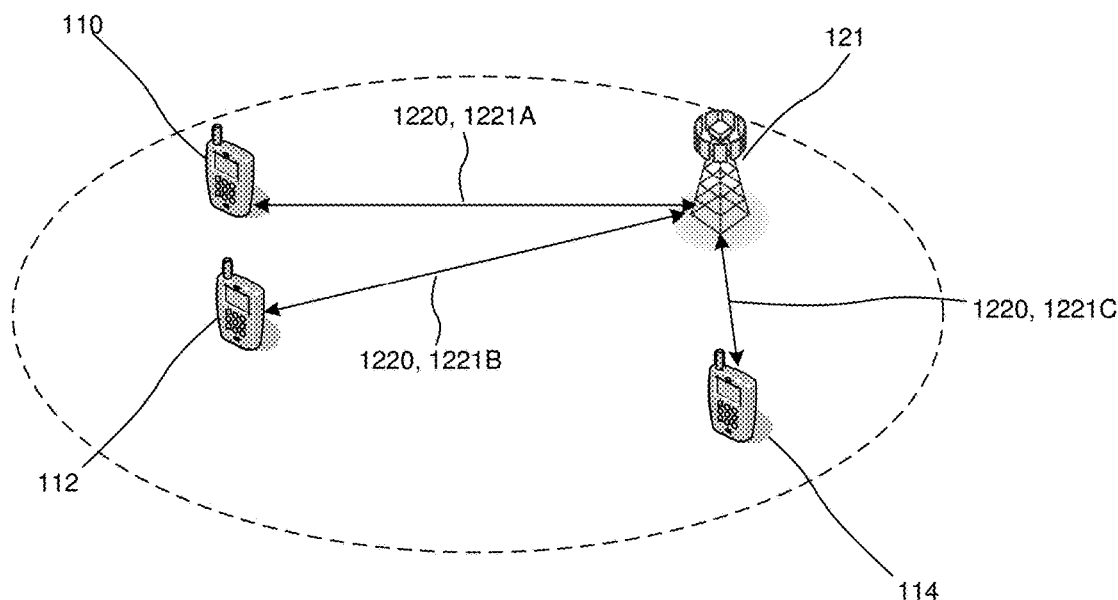
FIG. 6A illustrates one embodiment of message transmissions in accordance with embodiments of the current invention.

FIG. 6A illustrates one embodiment of message transmissions in accordance with one novel aspect. In particular, the gNB 121 transmits a higher layer configuration 1220 to the UEs 110, 112 and 114. The UEs 110, 112 and 114 receive the higher layer configuration 1220 from the gNB 121. The higher layer configuration 1220 indicates to the UEs 110, 112 and 114 a plurality of TCI states and a plurality of RS resources.

Figure 6B:
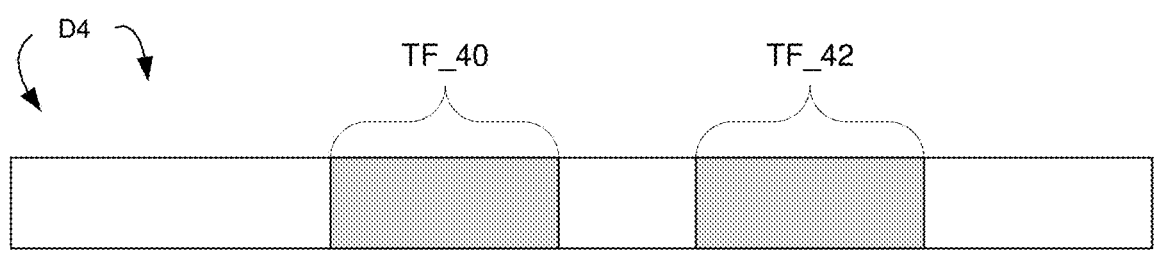
FIG. 6B illustrates one embodiment of the DCI format in accordance with embodiments of the current invention.

Then, the gNB 121 transmits a command 1221A to the UE 110, transmits a command 1221B to the UE 112 and transmits a command 1221C to the UE 114. Please refer to FIG. 6B which illustrates one embodiment of a DCI format D4 in accordance with one novel aspect. The command 1221A indicates to the UE 110 to monitor a specific TCI field TF 40 of the DCI format D4. The command 1221B indicates to the UE 112 to monitor a specific TCI field TF_40 of the DCI format D4. The command 1221C indicates to the UE 114 to monitor a specific TCI field TF_42 of the DCI format D4.

Therefore, after receiving the command 1221A, the UE 110 determines to monitor the specific TCI field TF_40 of the DCI format D4 according to the command 1221A. After receiving the command 1221B, the UE 112 determines to monitor the specific TCI field TF_40 of the DCI format D4 according to the command 1221B. After receiving the command 1221C, the UE 114 determines to monitor the specific TCI field TF_42 of the DCI format D4 according to the command 1221C. It should be noted that the commands 1221A to 1221C may be MAC-CEs, and the DCI format D4 may be DCI format 2_0.

Accordingly, the UEs 110 and 112 indicated to monitor the same TCI field TF_40 can be considered as being assigned in the one group. the UE 114 indicated to monitor the TCI field TF_42 can be considered as being assigned in another group. The UE(s) assigned in the same group may apply the same TCI state(s) and the same network parameters.

Figure 7:
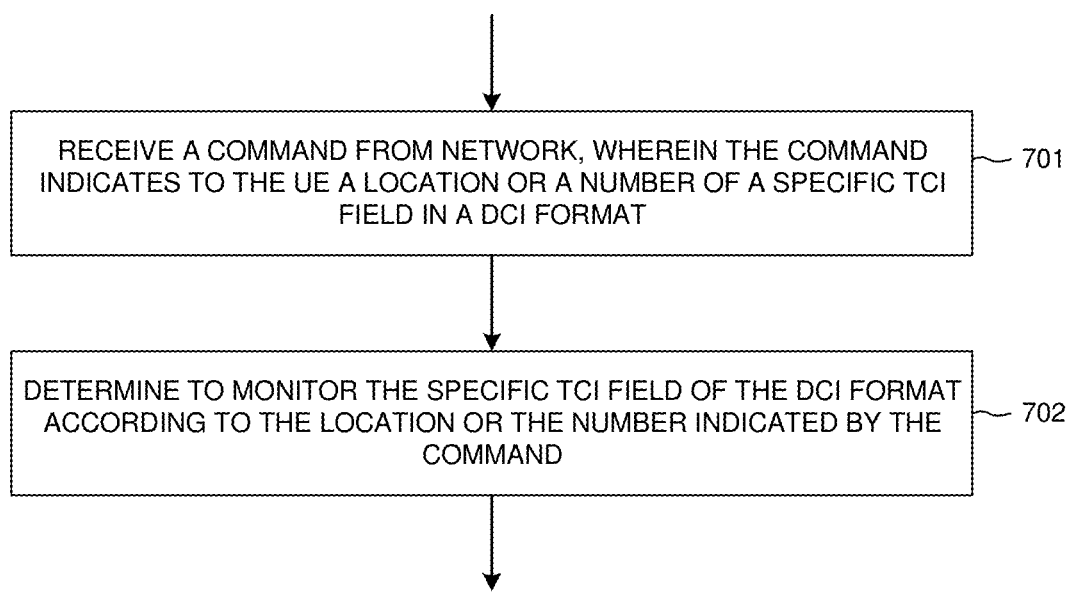
FIG. 7 is a flow chart of a method of monitoring TCI field of DCI format in accordance with embodiments of the current invention.

FIG. 7 is a flow chart of a method of monitoring TCI field of DCI format in accordance with one novel aspect. In step 701, a UE receives a command from a network. The command indicates to the UE a location or a number of a specific TCI field in a DCI format. In step 702, the UE determines to monitor the specific TCI field of the DCI format according to the location or the number indicated by the command.

Figure 8A:
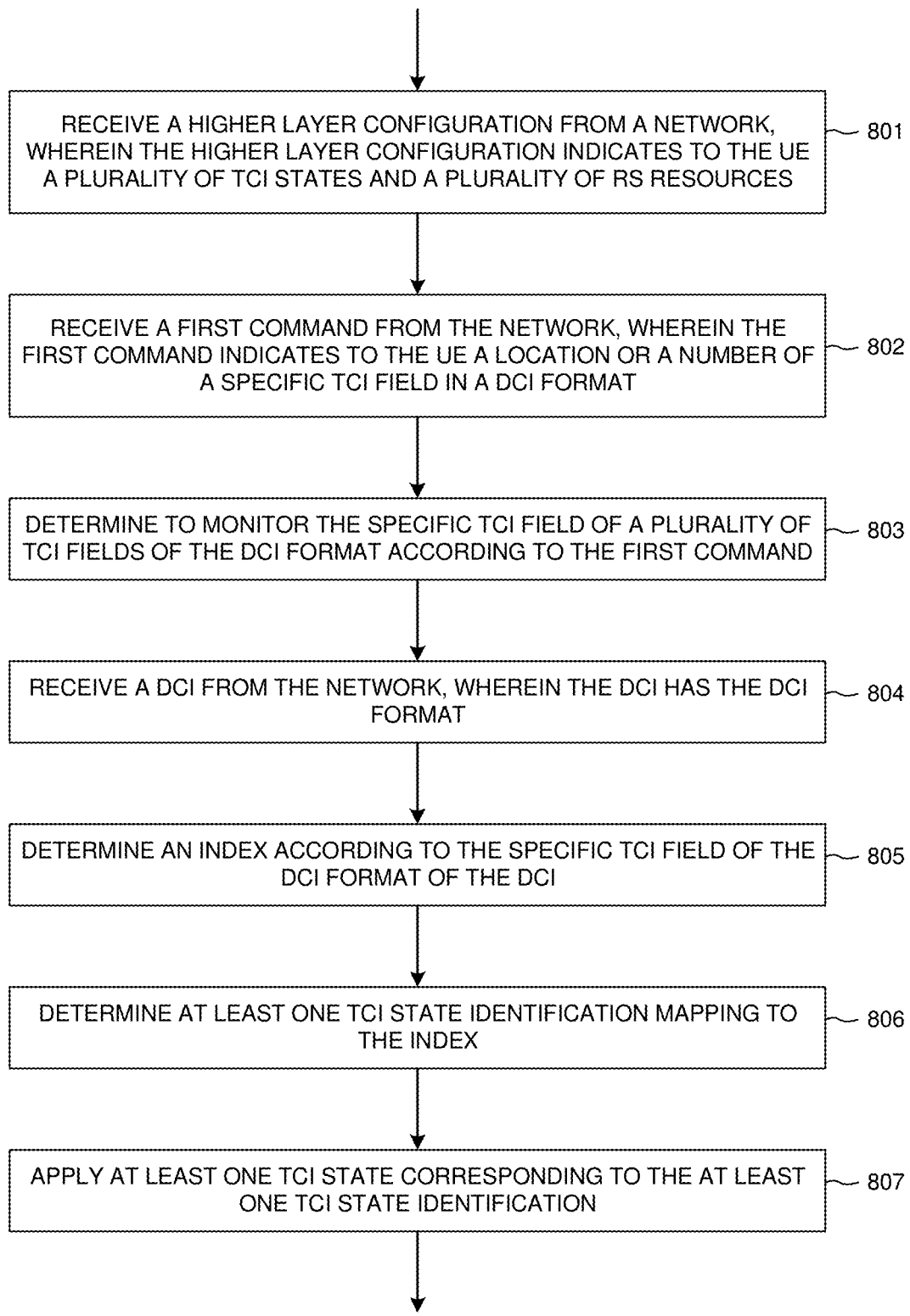
FIGS. 8A to 8C are flow charts of a method of monitoring TCI field of DCI format in accordance with embodiments of the current invention.
Figure 8B:
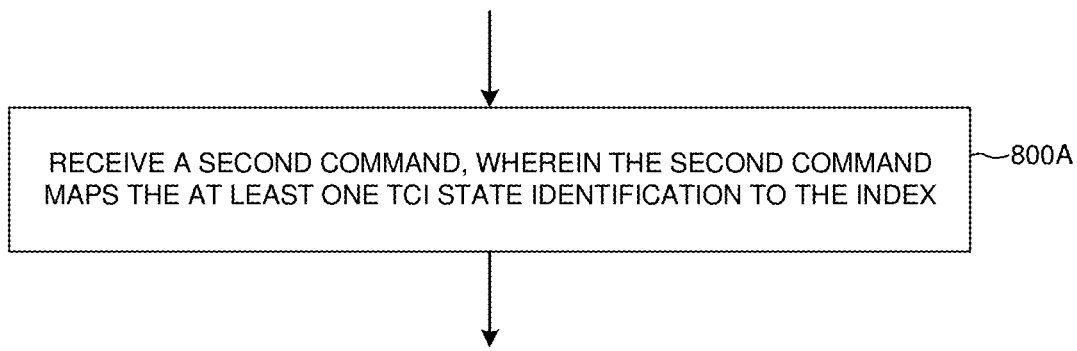
Figure 8C:
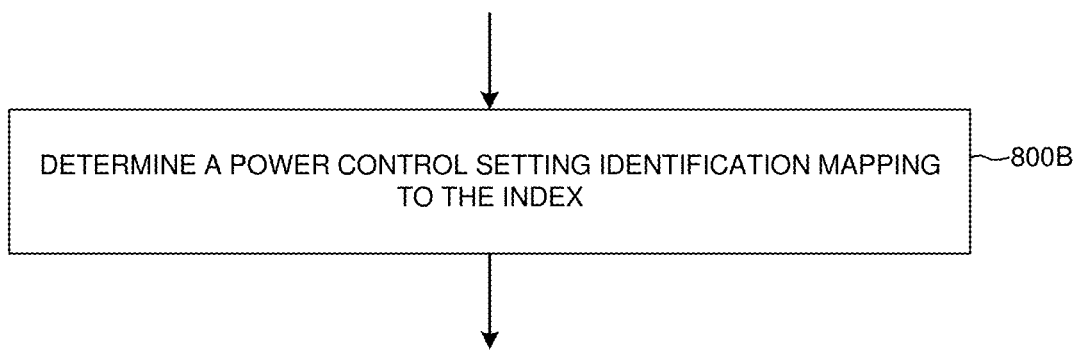

FIGS. 8A to 8C are flow charts of a method of monitoring TCI field of DCI format in accordance with one novel aspect. In step 801, a UE receives a higher layer configuration from a network. The higher layer configuration indicates to the UE a plurality of TCI states and a plurality of RS resources.

In step 802, the UE receives a first command from the network. The first command indicates to the UE a location or a number of a specific TCI field in a DCI format. In step 803, the UE determines to monitor the specific TCI field of a plurality of TCI fields of the DCI format according to the location or the number indicated by the first command.

In step 804, the UE receives a DCI from the network. The DCI has the DCI format. In step 805, the UE determines an index according to the specific TCI field of the DCI format of the DCI. In step 806, the UE determines at least one TCI state identification mapping to the index. In step 807, the UE applies at least one TCI state corresponding to the at least one TCI state identification. In one case, the at least one TCI state is applied after a time duration.

In one implementation, the first command maps the at least one TCI state identification with the index, and the at least one TCI state identification is determined according to the first command. In one implementation, the first command indicates to the UE: at least one cell identification; a cell group identification; or a specific cell identification of a cell configured in a cell group.

Further, when the UE applies the TCI state(s) corresponding to the at least one TCI state identification indicated in the specific TCI field in step 807, the TCI state(s) is applied to: (1) at least one cell associated with the at least one cell identification; (2) a group of cells associated with the cell group identification; or (3) a group of cells including a cell associated with the specific cell identification.

In one implementation, the method further includes a step 800A. In step 800A, the UE receives a second command. The second command maps the at least one TCI state identification to the index, and the at least one TCI state identification is determined according to the second command. In one implementation, the second command indicates to the UE: (1) at least one cell identification; a cell group identification; or a specific cell identification of a cell configured in a cell group.

In one implementation, the higher layer configuration maps the at least one TCI state identification with the index, and the at least one TCI state identification is determined according to the higher layer configuration. In one implementation, the higher layer configuration indicates to the UE: (1) at least one cell identification; a cell group identification; or a specific cell identification of a cell configured in a cell group.

In one implementation, the method further includes a step 800B. In step 800B, the UE determines a power control setting identification mapping to the index so that the UE can apply a power control setting corresponding to the power control setting identification.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    receiving, by a user equipment (UE), a first command from a network, wherein the first command indicates to the UE a location or a number of a specific transmission configuration indication (TCI) field in a downlink control information (DCI) format;
    determining, by the UE, to monitor the specific TCI field of the DCI format according to the location or the number indicated by the first command;
    receiving, by the UE, a DCI from the network, wherein the DCI has the DCI format;
    determining, by the UE, an index according to the specific TCI field of the DCI format of the DCI;
    determining, by the UE, at least one TCI state identification mapping to the index, wherein the first command maps the at least one TCI state identification with the index; and
    applying, by the UE, at least one TCI state corresponding to the at least one TCI state identification.

2. The method of claim 1, further comprising,
    receiving, by the UE, a second command from the network, wherein the second command maps the at least one TCI state identification with the index.

3. The method of claim 1, further comprising:
    receiving, by the UE, a higher layer configuration from the network, wherein the higher layer configuration maps the at least one TCI state identification with the index.

4. The method of claim 1, further comprising:
    determining, by the UE, a power control setting identification mapping to the index.

5. The method of claim 1, wherein the TCI state is applied after a time duration.

6. The method of claim 1, wherein the first command indicates to the UE:
    at least one cell identification;
    a cell group identification; or
    a specific cell identification of a cell configured in a cell group corresponding to the specific TCI field of the DCI format.

7. The method of claim 1, wherein the first command indicates to the UE:
    at least one cell identification;
    a cell group identification; or
    a specific cell identification of a cell configured in a cell group corresponding to the specific TCI field of the DCI format;
    wherein the at least one TCI state corresponding to the at least one TCI state identification is applied to:
        at least one cell associated with the at least one cell identification;
        a group of cells associated with the cell group identification; or
        a group of cells including a cell associated with the specific cell identification.

8. The method of claim 1, wherein the DCI format includes a plurality of TCI fields.

9. A user equipment (UE) comprising:
    a transceiver that receives a first command from a network, wherein the first command indicates to the UE a location or a number of a specific transmission configuration indication (TCI) field in a downlink control information (DCI) format, and receives a DCI having the DCI format from the network; and
    a TCI handling circuit that determines to monitor the specific TCI field of the DCI format according to the location or the number indicated by the first command;
    determines an index according to the specific TCI field of the DCI format of the DCI;
    determines at least one TCI state identification mapping to the index, wherein the first command maps the at least one TCI state identification with the index; and
    applies at least one TCI state corresponding to the at least one TCI state identification.

10. The UE of claim 9, wherein the transceiver further receives a second command from the network, the second command maps the at least one TCI state identification with the index.

11. The UE of claim 9, wherein the transceiver further receives a higher layer configuration from the network, the higher layer configuration maps the at least one TCI state identification with the index.

12. The UE of claim 9, wherein the TCI handling circuit further determines a power control setting identification mapping to the index.

13. The UE of claim 9, wherein the TCI state is applied after a time duration.

14. The UE of claim 9, wherein the first command indicates to the UE:
    at least one cell identification;
    a cell group identification; or
    a specific cell identification of a cell configured in a cell group corresponding to the specific TCI of the DCI format.

15. The UE of claim 9, wherein the first command indicates to the UE:
    at least one cell identification; or
    a cell group identification;
    a specific cell identification of a cell configured in a cell group corresponding to the specific TCI of the DCI format;
    wherein the at least one TCI state corresponding to the at least one TCI state identification is applied to:
        at least one cell associated with the at least one cell identification;
        a group of cells associated with the cell group identification; or
        a group of cells including a cell associated with the specific cell identification.

16. The UE of claim 9, wherein the DCI format includes a plurality of TCI fields.

* * * * *